(12) United States Patent
Ikeda

(10) Patent No.: US 8,233,112 B2
(45) Date of Patent: Jul. 31, 2012

(54) LIQUID CRYSTAL DISPLAY APPARATUS AND MANUFACTURING METHOD THEREOF

(75) Inventor: Masaki Ikeda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 213 days.

(21) Appl. No.: 12/668,860

(22) PCT Filed: Apr. 2, 2008

(86) PCT No.: PCT/JP2008/056571
§ 371 (c)(1),
(2), (4) Date: Jan. 12, 2010

(87) PCT Pub. No.: WO2009/013920
PCT Pub. Date: Jan. 29, 2009

(65) Prior Publication Data
US 2010/0188603 A1    Jul. 29, 2010

(30) Foreign Application Priority Data

Jul. 24, 2007   (JP) ................................. 2007-191876

(51) Int. Cl.
*G02F 1/1335*   (2006.01)
*G02F 1/13*   (2006.01)

(52) U.S. Cl. .......................................... 349/62; 349/192

(58) Field of Classification Search ................ 349/62, 349/65, 187, 192
See application file for complete search history.

(56) References Cited

U.S. PATENT DOCUMENTS

| 5,280,374 A | 1/1994 | Nakai et al. |
| 5,978,538 A | 11/1999 | Miura et al. |
| 2006/0029349 A1* | 2/2006 | Hoshi et al. ................ 385/129 |
| 2009/0190068 A1 | 7/2009 | Kawamura |

FOREIGN PATENT DOCUMENTS

| JP | 4-301617 A | 10/1992 |
| JP | 9-311237 A | 12/1997 |
| JP | 11-060271 A | 3/1999 |
| WO | WO-2007/034827 A1 | 3/2007 |

* cited by examiner

*Primary Examiner* — Sarah Hahm
(74) *Attorney, Agent, or Firm* — Birch, Stewart, Kolasch & Birch, LLP

(57) ABSTRACT

A liquid crystal display device includes a liquid crystal panel and a lighting device. The liquid crystal panel has a liquid crystal layer provided between a pair of glass substrates. The lighting device supplies illumination light to the liquid crystal panel. At least one of the glass substrates has a photonic crystal formed in a position so that it stops light from reaching a luminance point defect occurrence portion in the liquid crystal layer that is a cause of a luminance point defect. The photonic crystal absorbs light having a color displayable in the luminance point defect occurrence portion.

12 Claims, 9 Drawing Sheets

LIQUID CRYSTAL DISPLAY APPARATUS AND MANUFACTURING METHOD THEREOF

TECHNICAL FIELD

The present invention relates to a liquid crystal display device and a manufacturing method thereof.

BACKGROUND ART

There is a method of manufacturing a liquid crystal device, which is such as follows: providing a switching element (for example, a TFT), a pixel electrode, etc. on one of a pair of glass substrates; providing a counter electrode etc. on the other one of the glass substrates; thereafter, laminating the two glass substrates via a spacer; next, injecting liquid crystal into a gap between the two glass substrates so as to form a liquid crystal layer; thereafter, laminating polarizing plates onto surfaces of the two glass substrates to obtain a liquid crystal panel; and, finally, installing a lighting device including, for example, a plurality of cold cathode tubes as a light source to the liquid crystal panel.

The above-explained process of manufacturing the liquid crystal device can include steps of detecting inferiority by operating various kinds of inspection at predetermined timings, e.g. inspection after the liquid crystal layer is formed. In this inspection, presence or absence of display inferiority is inspected by placing a pair of polarizing plates for inspection in a manner holding the two glass substrates therebetween, lighting a backlight for inspection, and driving the switching element.

In such an inspection step, if, for example, the liquid crystal layer has a foreign substance that has entered therein, the foreign substance contained in the liquid crystal layer diffusely reflects the light striking thereto so that the luminance point defect, which is luminant in spite that black is displayed, is detected. The luminance point defect extremely reduces the display quality and decreases the yield rate of manufacture.

As a method of compensating such a luminance point defect, an art disclosed in, for example, Patent Document 1 is known. Patent Document 1 discloses a method of: forming a concavely processed portion in a vicinity of a surface of a transparent substrate on the incident side located on an irradiation path of irradiation light that irradiates a pixel in which the luminance point defect has been occurred; and forming a light diffusing area by processing a side face and a bottom face of the concavely processed portion into rough surfaces.
[Patent Document 1] Japanese Unexamined Patent Application Publication No. 04-301617

Problem to be Solved by the Invention

However, because the invention stated in the Patent Document 1 forms the concavely processed portion in the glass substrate, if the concavely processed portion is deeply formed, the strength of the glass substrate is reduced. On the other hand, if the depth of the concavely processed portion is shallowly formed so that reduction of strength of the glass substrate is avoided, a space of a certain distance has to exist between the concavely processed portion and the defect portion. Where such a space exists, the incident light from the outside of the concavely processed portion (i.e. an unprocessed portion) causes diffraction when passing through the glass substrate and reaches the defect portion, which results in the luminance point defect uncompensated.

DISCLOSURE OF THE INVENTION

The present invention was achieved on a basis of the circumstances as above, and its object is to provide a liquid crystal display device having a higher display quality with a luminance point defect certainly invisible. Furthermore, an object of the present invention is to provide a method of manufacturing the liquid crystal display device, the method including a step capable of suitably compensating the luminance point defect that is occurred in the liquid crystal display device.

Means for Solving the Problem

In order to solve the above-described problem, the liquid crystal display device in accordance with the present invention including: a liquid crystal panel having a liquid layer provided between a pair of glass substrates; and a lighting device that supplies illumination light to the liquid crystal panel. The liquid crystal display device is characterized in that at least one of the pair of glass substrates has a photonic crystal formed in a position capable of blocking light toward a luminance point defect occurrence portion that is a cause of a luminance point defect. The photonic crystal is capable of absorbing light having a color displayable in the luminance point defect occurrence portion.

During repeated examination of a means for compensating for the luminance point defect without reducing the strength of the glass substrate, i.e. without forming a concavity in the glass substrate, the inventor of the present invention has found that light of the light source is controllable by forming a portion having a specific structure in the glass substrate. This specific structure is an artificial crystal called a photonic crystal. The photonic crystal is composed of two or more periodically arranged structural bodies having different refractive indexes. The photonic crystal can control light as required (for example, to stop, store, reverse, etc. the light). For example, the photonic crystal which has a substantially same structural period with a wavelength of the incident light can absorb the incident light.

Note here that the glass substrate sufficiently provided in the liquid crystal display device is a material having extremely high homogeneity of the refractive index. Therefore, by forming a portion having a refractive index different from that of the substrate structure at a certain period, the photonic crystal composed of the two periodically arranged structural bodies having the different refractive indexes can be easily obtained.

Accordingly, the liquid crystal display device in accordance with the present invention shall have the glass substrate having a photonic crystal formed in a position capable of blocking light toward a luminance point defect occurrence portion that is a cause of luminance defect, the photonic crystal being capable of absorbing light having a color displayable in the luminance point defect occurrence portion. Thus, the light having the color displayable in the luminance point defect occurrence portion is blocked by this photonic crystal. As a result of this, the luminance point defect occurrence portion can be invisible with no reduction of the strength of the glass substrate, so that the liquid crystal display device having a higher display quality can be obtained.

EXPLANATION OF REFERENCE SYMBOLS

BEST MODE FOR CARRYING OUT THE INVENTION

An embodiment in accordance with the present invention will be described with reference to FIGS. 1 through 7.

Figure 1:
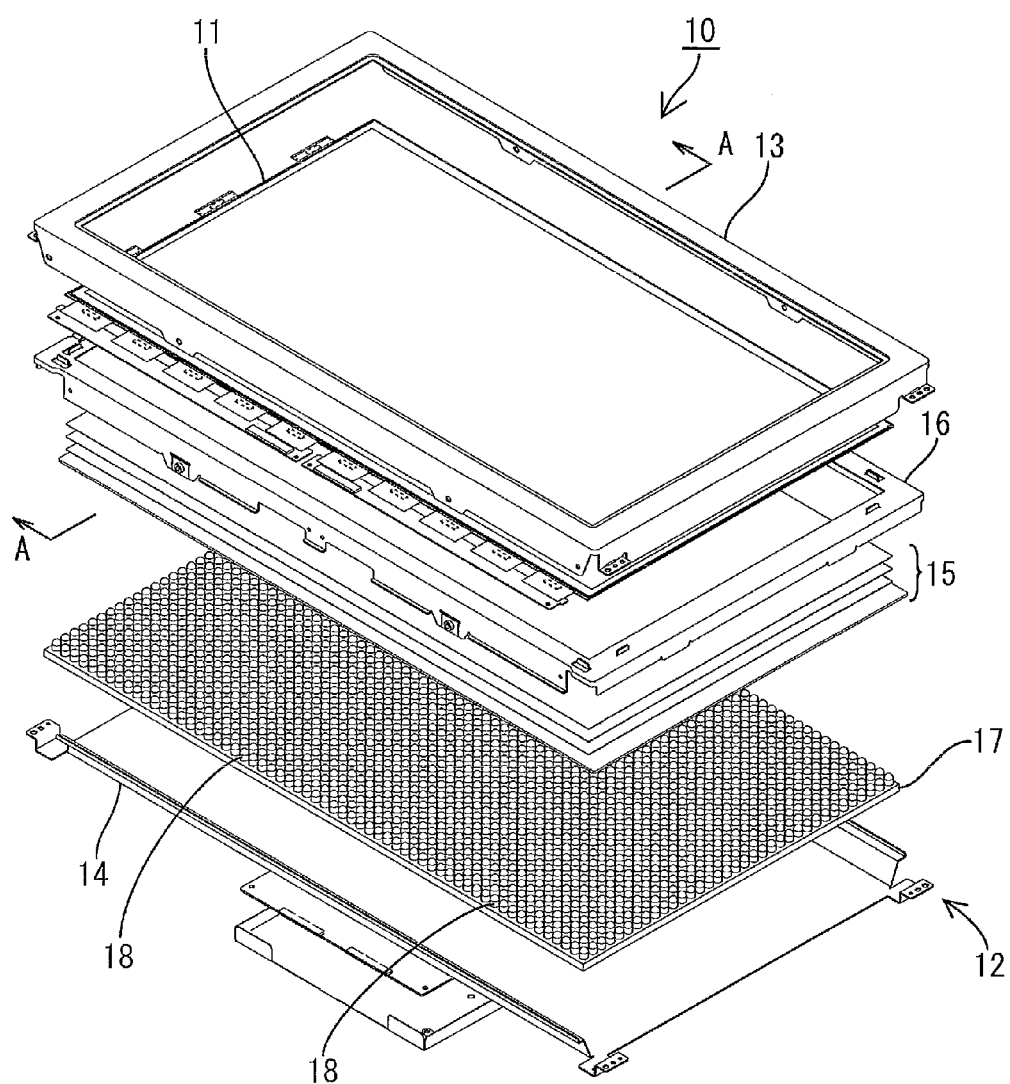
FIG. 1 is a perspective view illustrating a schematic configuration of a liquid crystal display device of an embodiment in accordance with the present invention.
Figure 2:
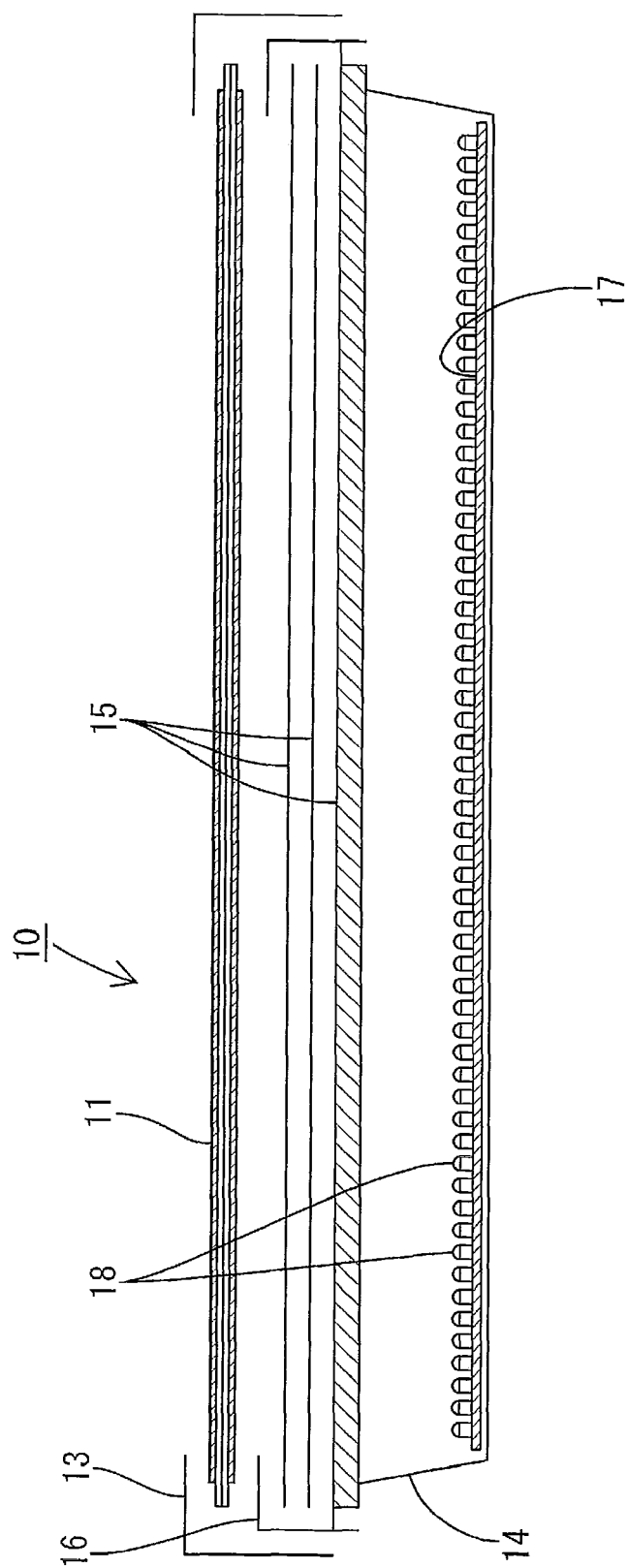
FIG. 2 is a sectional view of the liquid crystal display device of FIG. 1 taken on line A-A.
Figure 3:
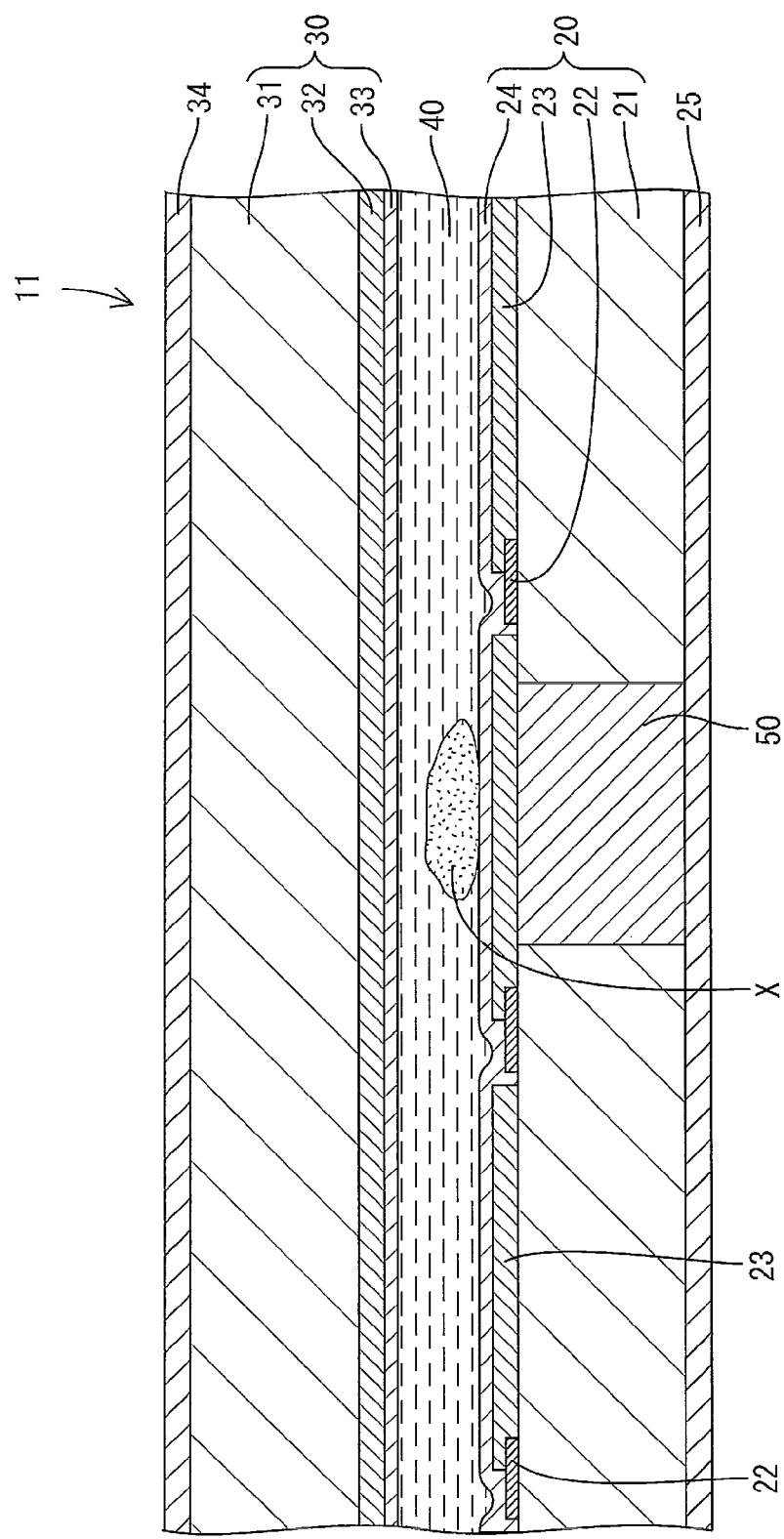
FIG. 3 is a sectional view of a main part of a liquid crystal panel that the liquid crystal display device of FIG. 1 includes.
Figure 4:
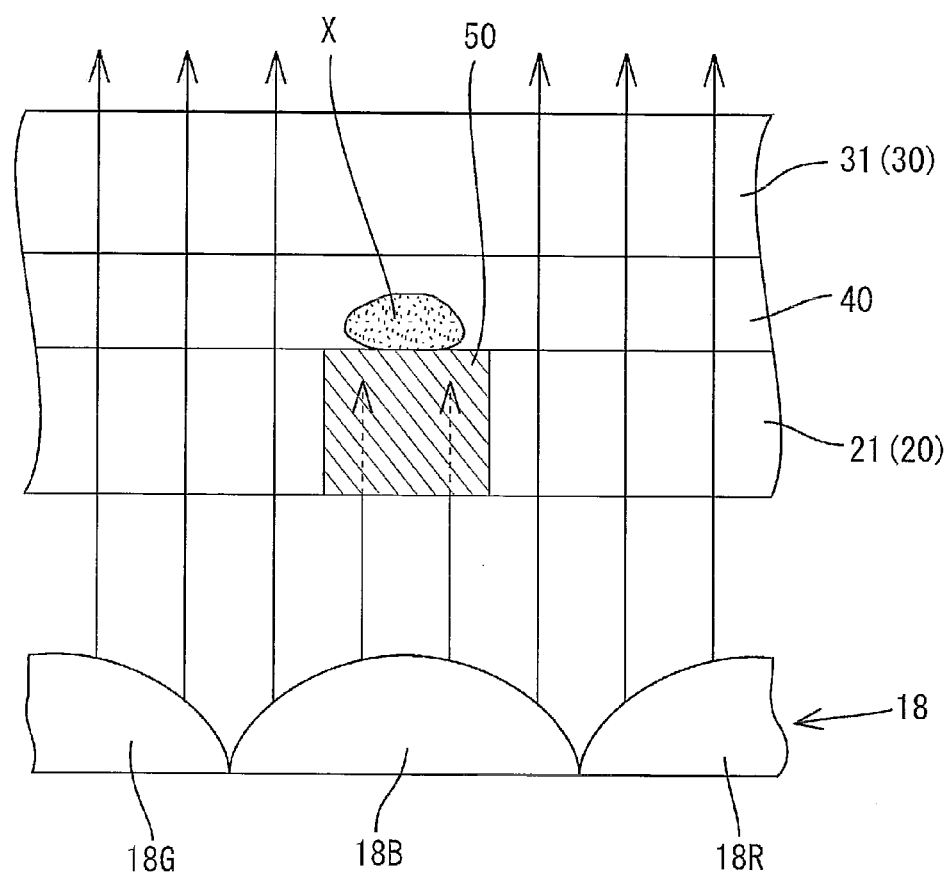
FIG. 4 is a explanatory view illustrating an operational effect of the liquid crystal display device of the embodiment.
Figure 5:
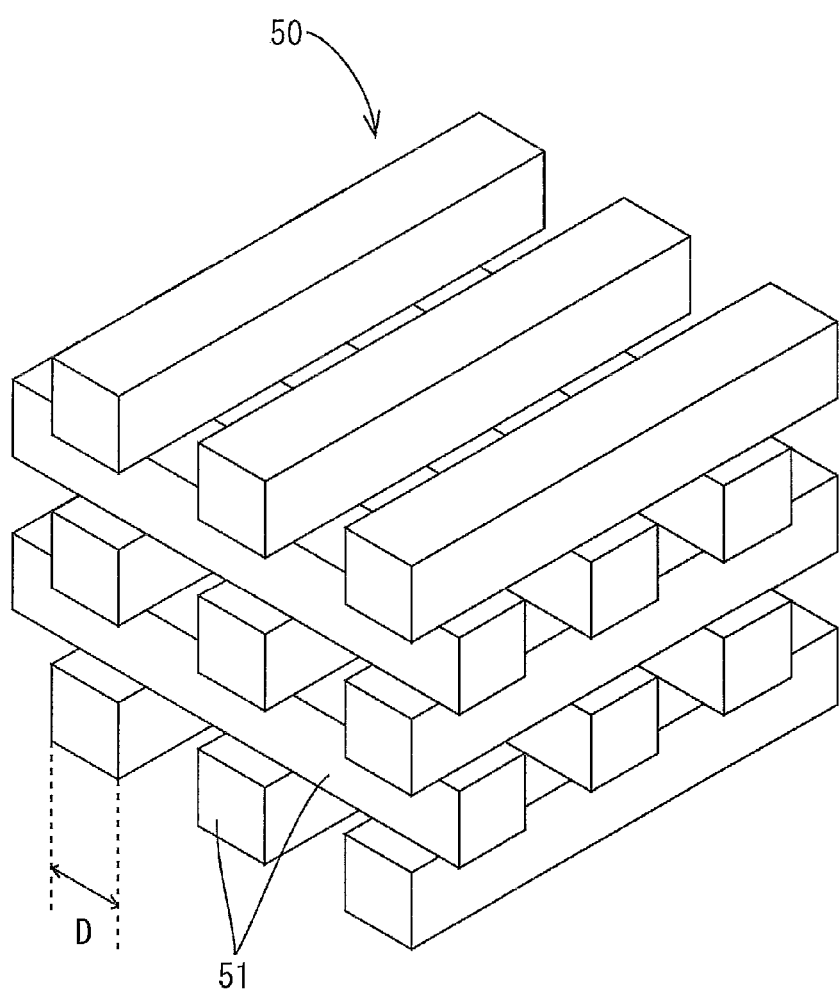
FIG. 5 is a view illustrating a schematic configuration of a photonic crystal.
Figure 6:
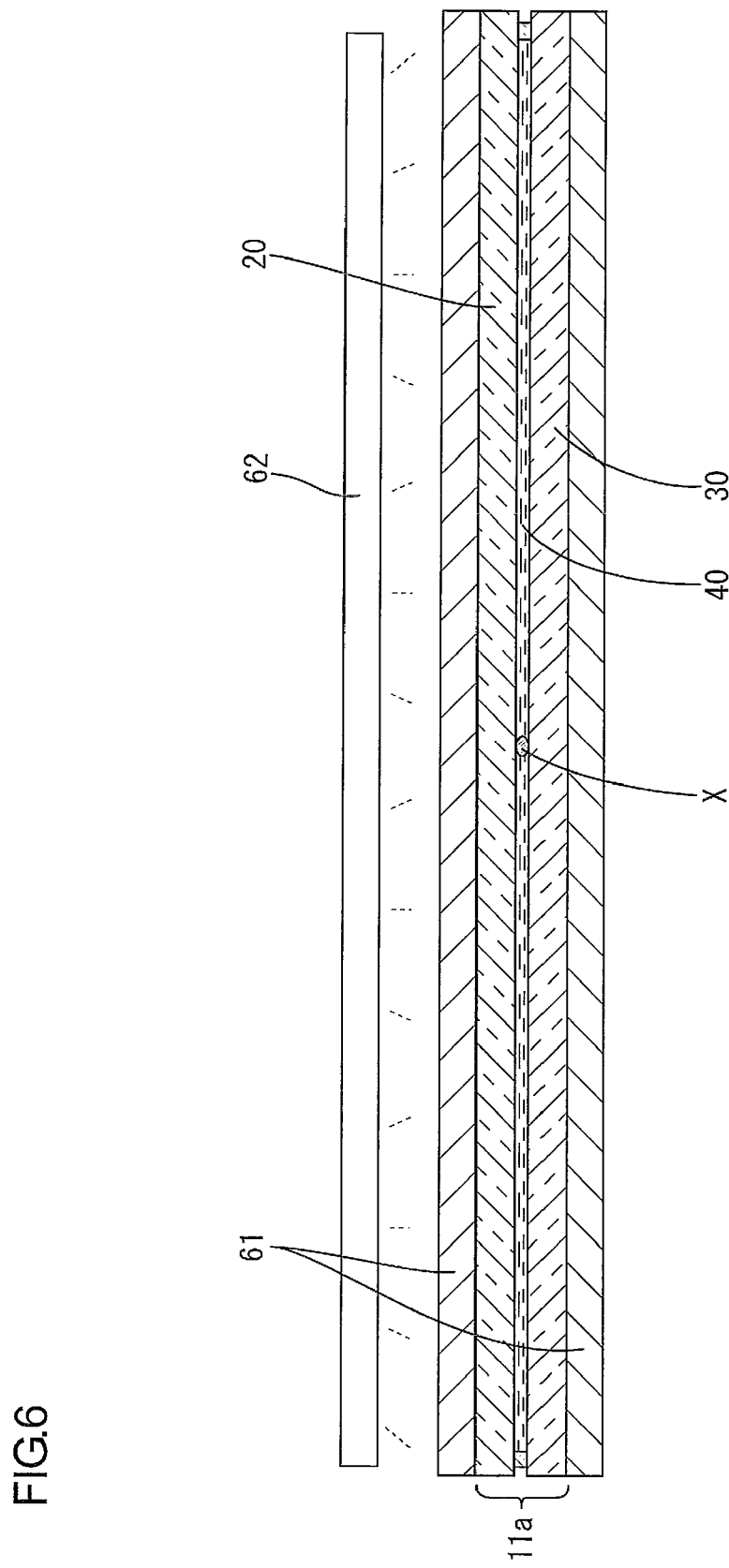
FIG. 6 is an explanatory view illustrating an aspect of a step of lighting inspection for an inspection-object liquid crystal panel.
Figure 7:
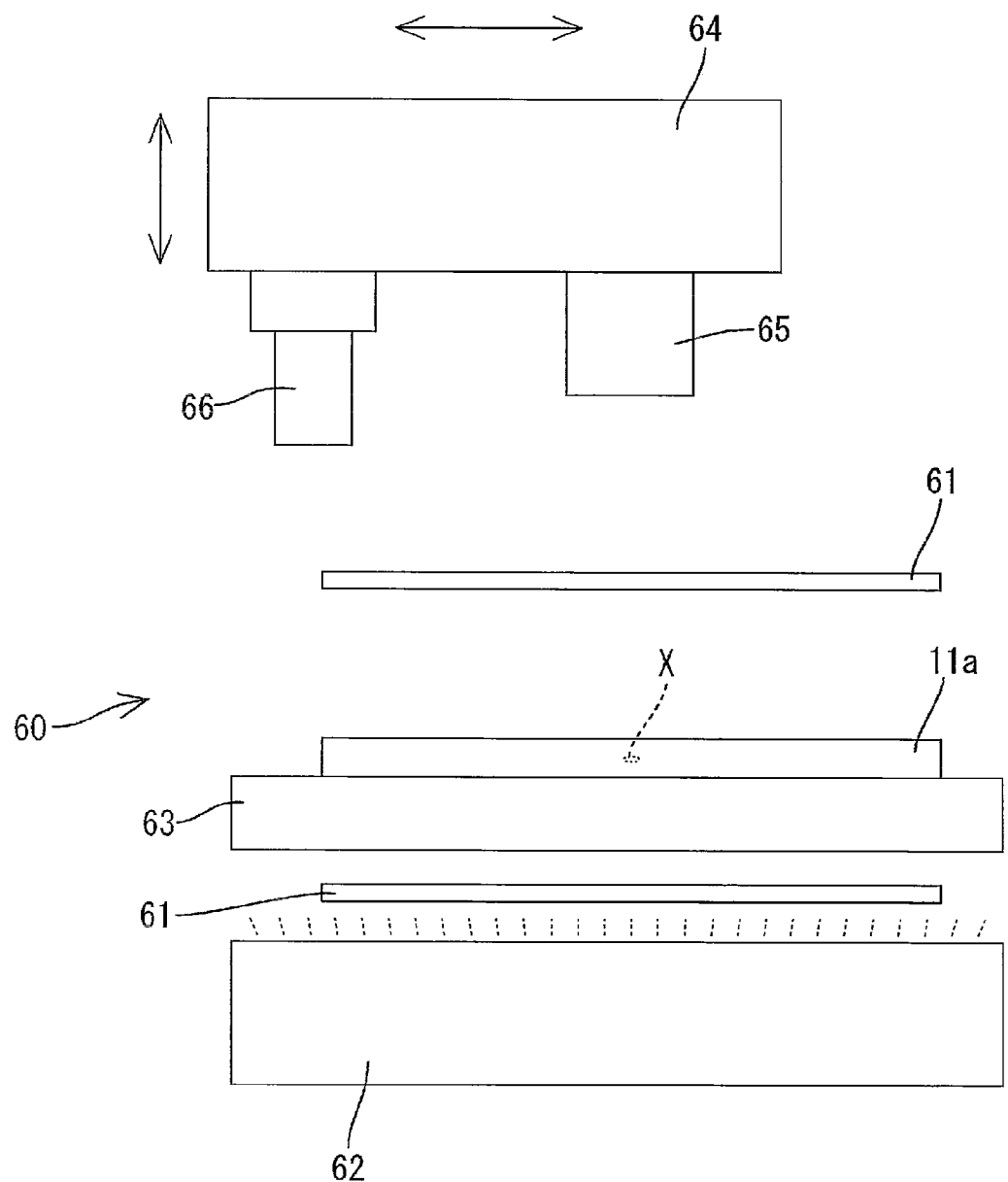
FIG. 7 is a side view illustrating a schematic configuration of a luminance point defect compensating device.

FIG. 1 is a perspective view illustrating a schematic configuration of a liquid crystal display device of this embodiment; FIG. 2 is a sectional view of the liquid crystal display device of FIG. 1 taken on line A-A; FIG. 3 is a sectional view of a main part of a liquid crystal panel that the liquid crystal display device of FIG. 1 includes; FIG. 4 is a explanatory view illustrating an operational effect of the liquid crystal display device of this embodiment; FIG. 5 is a view illustrating a schematic configuration of a photonic crystal; FIG. 6 is an explanatory view illustrating an aspect of a step of lighting inspection for an inspection-object liquid crystal panel; and FIG. 7 is a side view illustrating a schematic configuration of a luminance point defect compensating device.

First, a general configuration of a liquid crystal display device 10 of this embodiment will be described. As illustrated in FIGS. 1 and 2, the liquid crystal display device 10 includes a liquid crystal panel 11 and a backlight device (a lighting device) 12, which are integrally held by a bezel 13 etc. The liquid crystal panel 11 has a rectangular shape. The backlight device 12 is an external light source. The backlight device 12 is a backlight device of a so-called direct type. The backlight device 12 is sufficiently provided with a plurality of light sources (LEDs (light sources) 18 are herein used) directly below the backside of a panel face (a display face) of the liquid crystal panel 11 and along the panel face. The liquid crystal panel 11 will be described below.

The backlight device 12 includes a backlight chassis (chassis) 14, a plurality of optical members 15 (a diffuser plate, a diffuser sheet, a lens sheet, and a reflection polarizing plate, which are in this order from below in the figure), and a frame 16. The backlight chassis 14 has a substantial box shape with the top face side open. The optical members 15 are attached so as to cover the opening of the backlight chassis 14. The frame 16 holds these optical members 15 over the backlight chassis 14. Furthermore, a light source substrate 17, LEDs 18, and a dimmer circuit (not illustrated) are disposed in the backlight chassis 14. The LEDs 18 are disposed on the light source substrate 17. The dimmer circuit can light and dim the plurality of LEDs 18. The LEDs 18 emit light having respective single colors of R (red), G (green), and B (blue) (hereinafter represented also as 18R, 18G, and 18B). The LEDs 18R, 18G, 18B are arranged in lines, in a matrix, and in a predetermined order on a surface (a face on the liquid panel 11 side) of the light source substrate 17 and along directions of the long sides and the short sides of the light source substrate 17. Note that, in the backlight device 12, the optical members 15 side from the LEDs 18 is a light emission side.

Next, the liquid crystal panel 11 will be described. As illustrated in FIG. 3, the liquid crystal panel 11 has a configuration of a pair of substrates 20, 30 laminated with a predetermined gap therebetween and liquid crystal sealed between the two substrates 20, 30. A liquid crystal layer 40 is formed with this liquid crystal.

The substrate 20 is an element substrate. The substrate 20 includes a glass substrate 21, TFTs (thin-film transistor) 22 as semiconductor elements, pixel electrodes 23, and an alignment film 24. The TFTs 22 are formed on the liquid crystal layer 40 side of the glass substrate 21. The pixel electrodes 23 are electrically connected to the TFTs 22. The alignment film 24 is formed on the liquid crystal layer 40 side of these TFTs 22 and pixel electrodes 23. Furthermore, a polarizing plate 25 is disposed on a side of the glass substrate 21, the side being opposite from the liquid crystal layer 40 side. Note that, out of the pair of substrates 20, 30, the substrate 20 (the glass substrate 21) is disposed on the backlight device 12 side.

On the other hand, the substrate 30 is an opposite substrate. The substrate 30 includes a glass substrate 31, a counter electrode 32, and an alignment film 33. The counter electrode 32 is formed on the liquid crystal layer 40 side of the glass substrate 31. The alignment film 33 is formed on the liquid crystal layer 40 side of the counter electrode 32. Furthermore, a polarizing plate 34 is disposed on a side of the glass substrate 31, the side being opposite from the liquid crystal layer 40 side.

Furthermore, in this embodiment, as illustrated in FIGS. 3 and 4, a means for blocking light toward a foreign substance (a luminance point defect occurrence portion) X that has entered the liquid crystal layer 40 and is a possible cause of the luminance point defect is provided. That is, the photonic crystal 50 is formed in a position in the glass substrate 21 of the substrate 20, the position being capable of blocking light supplied from the LEDs 18 toward the foreign substance X. Specifically, the photonic crystal 50 is formed throughout the thickness direction of the glass substrate 21 between the LED 18B, which is one of the LEDs 18, emitting B (blue) and the foreign substance X.

As illustrated in FIG. 5, the photonic crystal 50 has a structure of high-refractive index portions 51 that are periodically arrayed in the glass substrate 21. The high-refractive index portions 51 have a refractive index 2.10 (a value for light at a wavelength of 589.3 nm), which is higher than a reflective index 1.51 (likewisely a value for light at a wavelength of 589.3 nm) of a normal glass substrate composition. Note that, in FIG. 5, a space between the adjacent high-refractive index portions 51 represents the normal glass substrate composition. Each high-refractive index portion 51 has a width D of 430 nm, which is a length substantially same with the wavelength of the emission light (the illumination light) of the LED 18B. Therefore, as illustrated in FIG. 4, the incident light from the LED 18B into the photonic crystal 50 is absorbed. That is, in a view from the foreign substance X, the illumination light is blocked by the photonic crystal 50 and does not reach the foreign substance X.

With the liquid crystal display device 10 of this embodiment described above, because the photonic crystal 50 capable of absorbing the light of the LED 18B is provided in a position in the glass substrate 21, the position being capable of blocking the light toward the foreign substance (the luminance point defect occurrence portion) X that is a possible cause of the luminance point defect, the light does not reach the foreign substance X. Therefore, the luminance point defect is invisible.

Normally, the light emitted from the LED 18B passes through the liquid crystal panel 11 and is viewed as blue. However, in a case where the foreign substance X has entered the liquid crystal layer 40 in the liquid crystal panel 11, the light emitted from the LED 18B is diffused by the foreign substance X and can be viewed as, for example, a luminance point defect that presents white that has a higher luminance.

Therefore, in this embodiment, the photonic crystal 50 is provided in a position capable of blocking the light toward the foreign substance X. Because the high-refractive index portions 51 have the structural period substantially same with the wavelength of the light of the LED 18B, the photonic crystal 50 operates to absorb the light. Accordingly, the incident light into the photonic crystal 50 is blocked therein and does not reach the foreign substance X. As a result of this, though the foreign substance X that is a cause of the luminance point defect has entered, it is not viewed as the luminance point defect. Thus, the liquid crystal display device 10 having the higher display quality can be obtained.

Furthermore, conventionally, the means for blocking light (reducing light) as described above is a concavity formed in the glass substrate, which can reduce the strength of the glass substrate. In this embodiment, the means is simply a structure, i.e. the photonic crystal 50, having the different refractive indexes. Therefore, there is no concern for reduction of strength of the glass substrate.

Furthermore, in this embodiment, the photonic crystal 50 is formed in the glass substrate 21 disposed on the backlight device 12 side. That is, the photonic crystal 50 is formed on the side of the liquid crystal display device 10, the side being opposite from the display face. Therefore, there is no concern for the photonic crystal 50 to be visible. Thus, the liquid crystal device 10 with the higher quality can be provided.

Furthermore, in this embodiment, the photonic crystal 50 is formed throughout the thickness direction of the glass substrate 21.

In this case, a portion remaining as the original glass substrate 21 with no the photonic crystal 50 formed does not exist between a portion where the foreign substance X has entered and the photonic crystal 50. This can prevent the light emitted from the LEDs 18 from diffracting, while passing through the glass substrate 21, and reaching the foreign substance X. Thus, the better display quality with the luminance point defect invisible can be realized.

Furthermore, in this embodiment, the light source has the configuration of the plurality of LEDs 18 that have the selectivity in the wavelength of the light to emit and are arrayed. In order to absorb light using the photonic crystal 50, it is necessary that the wavelength of the light can be identified. That is, the incident light into the photonic crystal 50 shall not be white light that ranges the entire of the visible wavelength range but shall be light that has a restricted wavelength.

Therefore, the LEDs 18 that are capable of selecting the wavelength at the single wavelength is used as the light source, so that the color displayable in the luminance point defect occurrence portion can be easily identified, and the illumination light can be certainly absorbed by the photonic crystal 50.

Next, a method of manufacturing the liquid crystal display device 10 will be described.

Herein, manufacturing steps including a compensation step will mainly be described.

First, the glass substrate 21 is provided, and the TFTs 22 and the pixel electrodes 23 are formed on the glass substrate 21. Then, the alignment film 24 is formed on the TFTs 22 and on the pixel electrodes 23. Thus, the substrate 20, which is the element substrate, is produced.

On the other hand, separately from the above glass substrate 21, the glass substrate 31 is provided, the counter electrode 32 is formed on the glass substrate 31, and, further, the alignment film 33 is formed on the counter electrode 32. Thus, the substrate 30, which is the opposite substrate, is produced.

The substrate 20 and the substrate 30 are laminated together with a predetermined space therebetween, and liquid crystal is sealed in the space. Thus, the liquid crystal layer 40 is formed. Furthermore, the polarizing plates 25, 34 are mounted on the respective faces of the two substrates 20, 30, the faces being opposite from the liquid crystal layer 40 side. Thus, the liquid crystal panel 11 is produced (see FIG. 3). Note that, in a below-described step of assembling the liquid crystal panel 11 and the backlight device 12, the substrate 20 (the glass substrate 21) out of the two substrates 20, 30 shall be disposed on the backlight device 12 side.

In the above-described manufacturing process, after the liquid crystal layer 40 is formed, lighting inspection for inspecting the presence and absence of display inferiority is performed (the liquid crystal panel during the manufacturing progress of this case will hereinafter be called an inspection-object liquid crystal panel 11a).

Specifically, as illustrated in FIG. 6, first, a pair of polarizing plates 61 for inspection are positioned in a manner holding the substrates 20, 30 of the inspection-object liquid crystal panel 11a therebetween. Next, a backlight 62 for inspection, which has the plurality of LEDs 18 that are arranged in lines and in a predetermined order and emit light having respective single colors of R (red), G (green), and B (blue), is lighted. Then, the wiring formed on the glass substrate 21 is connected to a circuit for inspection, and a signal is supplied to the wiring as desired. Thus, the TFTs 22 are driven. Thus, a display state is obtained by thus controlling the oriented state of the liquid crystal that configures the liquid crystal layer 40. Then, the display state is inspected by image process or visually by the inspector.

At this time, there is a case where the luminance point defect, which is viewed as a luminant point in spite that black is displayed, is detected. This luminance point defect can be caused by the foreign substance X that has entered the liquid crystal layer 40 and diffusely reflects the light striking thereto. When such a luminance point defect is detected, the luminance point defect is compensated in a luminance point defect compensation step, which will be described below. Note that a conceivable cause of entrance of the foreign substance X into the liquid crystal layer 40 is that the foreign substance X has been clinging on the face on the liquid crystal layer 40 side of the substrates 20, 30 at a stage before the liquid crystal is injected, that the foreign substance X has been mixed in the liquid crystal, etc.

The luminance point defect compensation step includes: a step of identifying the original color to be displayed in the portion where the foreign substance X has been mixed; a step of identifying a compensation position capable of block the light toward the foreign substance X in the glass substrate 21; and a step of forming the photonic crystal 50 in the compensation position of the identified glass substrate 21, the photonic crystal 50 being capable of absorbing the light having the original color to be displayed.

In the luminance point defect compensation step, the luminance point defect is compensated using a luminance point defect compensation device 60 illustrated in FIG. 7. The luminance point defect compensation device 60 is configured by a stage 63 (not illustrated in FIG. 6), the pair of polarizing plates 61 for inspection, the backlight 62 for inspection, and an XYZ drive part 64. The inspection-object liquid crystal panel 11*a*, which is the compensation object, is placed on the stage 63. The pair of polarizing plates 61 for inspection is disposed in a manner holding the stage 63 therebetween. The XYZ drive part 64 moves parallel to and perpendicularly to the stage 63. Out of these parts, the XYZ drive part 64 has a CCD camera 65 and a laser irradiation part 66 that are disposed side by side in a predetermined positional relation. The CCD camera images the foreign substance X and its surrounding portion. The laser irradiation part 66 emits the laser for forming the photonic crystal 50. Note that the stage 63 is made of glass so that the light emitted from the backlight 62 for inspection can pass therethrough.

Using this luminance point defect compensation device 60, first, the color and the position is identified. The color to be identified is the original color to be displayed in the portion where the foreign substance X has been mixed. The position to be identified is the compensation position capable of blocking the light toward the foreign substance X in the glass substrate 21. First, the inspection-object liquid crystal panel 11*a*, which is the compensation object, is placed in a predetermined position on the stage 63 with the glass substrate 21 up. Then, the backlight 62 for inspection is lighted, and the inspection-object liquid crystal panel 11*a* is caused to display black. In this state, the display state is imaged using the CCD camera 65 while the XYZ drive part 64 being moved parallel to the stage 63, and the image result is image processed. At this time, the predetermined order in which the displayed color is displayed is utilized: the original color to be displayed in the portion where the foreign substance X has been mixed is identified from the colors surrounding the luminance point defect. Along with this, the compensation position capable of blocking the light toward the foreign substance X is identified from the position and the size of the foreign substance X.

Next, the process shifts to a step of forming the photonic crystal 50 in the identified compensation position of the glass substrate 21, the photonic crystal 50 being capable of absorbing the light having the original color to be displayed in the portion where the foreign substance X has been mixed. In this step, the glass substrate 21 is irradiated with femtosecond laser having the pulse width on the order of 10-13 seconds. Thus, the photonic crystal 50 is formed.

In the step of forming the photonic crystal 50, first, information on the position and the color, which have been identified in the above-described step, is transferred to a laser control device (not illustrated). Namely, the transferred information is: information on the position capable of blocking the light toward the foreign substance X; and information on the original color to be displayed in the portion where the foreign substance X has been mixed.

Then, the laser control device converts the information on the position capable of blocking the light toward the foreign substance X into XYZ coordinates that indicate the position to form the photonic crystal 50 and its size. Furthermore, the laser control device, from the information on the original color to be displayed in the portion where the foreign substance X has been mixed, calculates a wavelength that presents the original color and determines the wavelength as the structural period of the photonic crystal 50. Specifically, in this embodiment, the color to be displayed is determined to be B (blue), while the wavelength is calculated to be 430 nm.

Next, on a basis of the data for forming the photonic crystal 50, the XYZ drive part 64 is moved, and the glass substrate 21 is irradiated with the laser from the laser irradiation part 66, which is included in the XYZ drive part 64. Note that, in this embodiment, the laser irradiation is performed under conditions as follows: the wavelength of 780 nm, the pulse width of 100 fs, the repetition frequency of 1 (one) kHz, the pulse energy of 1 (one) mJ, and the output of 1 (one) W.

In the glass substrate 21, the position whereto the above-described laser is focused is instantaneously heated up, is pressurized, and thereby is densified, i.e. obtains a higher refractive index (the high-refractive index portion 51 in FIG. 5). The high-refractive index portion 51 is formed so as to have the width of 430 nm, and further, at a predetermined interval, the glass substrate is again irradiated with the laser so that the high-refractive index portion 51 is formed. By repeating this procedure, the photonic crystal 50 having the periodically repeated high-refractive index portions 51 is obtained. Note that, in this embodiment, the photonic crystal 50 is formed throughout the thickness direction of the glass substrate 21.

Such a photonic crystal 50 absorbs incident light into the photonic crystal 50 provided that the incident light substantially has the wavelength of 430 nm. In a view from the foreign substance X, the light is blocked by the photonic crystal 50 and does not reach the foreign substance X.

The luminance point defect in the liquid crystal panel 11 is compensated after going through the above-described steps. Then, a driver (not illustrated) and the backlight device 12, which are produced through other steps, are mounted to the liquid crystal panel 11. Thus, the liquid crystal device 10 is produced.

The backlight device 12 is produced by arraying the plurality of LEDs 18, which emit light having the respective single colors of R, G, B (i.e. having the wavelength selectivity), in lines along the directions of the long sides and the short sides of the light source substrate 17, in a matrix, and in a predetermined order so as to be the light source.

Note that the predetermined order of the plurality of LEDs 18 is identical in the backlight device 12 and in the backlight 62 for inspection.

The method of manufacturing the liquid crystal display device 10 of this embodiment including the compensation step as described above provides the liquid crystal display device 10 sufficiently provided with the photonic crystal 50 in the position in the glass substrate 21, the position being capable of blocking light toward the foreign substance X (the luminance point defect occurrence portion), the photonic crystal capable of absorbing the light having the color displayable in the portion where the foreign substance x has been mixed. With the liquid crystal display device 10, the light emitted from the LED 18B is blocked by the photonic crystal 50 and does not reach the foreign substance X. As a result of this, diffused reflection of light by the foreign substance X is not caused, and accordingly, the luminance point defect can be compensated so as to be invisible. Note that, because the photonic crystal 50 is obtained simply by periodically forming the portions having the different refractive index (density), the strength of the glass substrate is not reduced.

Furthermore, in this embodiment, the photonic crystal 50 is formed by irradiation with the femtosecond laser, the photonic crystal 50 being capable of absorbing the light having the color displayable in the portion where the foreign substance X has been mixed. When the glass substrate is irradiated with the femtosecond laser, the irradiated portion absorbs the energy faster than the laser heat transfers to the portion surrounding the laser irradiation point. Therefore, the glass substrate surrounding the laser irradiation point is neither thermally nor chemically damaged. Thus, there is no concern for reduction of the display quality of the liquid crystal display device 10.

Other Embodiments

While the embodiment in accordance with the present invention is illustrated as above, the present invention is not limited to the embodiment described above with reference to the drawings. For example, following embodiments are also included within the scope of the present invention:

(1) In the above-described embodiment, the photonic crystal 50 is formed in the substrate 20 (the glass substrate 21) that is disposed on the backlight device side. The photonic crystal 50 may be formed in the substrate 30 (the glass substrate 31) that is on the side opposite from the backlight device side (i.e. the display face side). Furthermore, the photonic crystal 50 may be formed in both substrates 20, 30 (the glass substrates 21, 31).

(2) In the above-described embodiment, the photonic crystal 50 is formed throughout the thickness direction of the glass substrate 21. The thickness of the photonic crystal is arbitrary. In this case, the formed position of the photonic crystal in the thickness direction of the glass substrate is arbitrary such as, for example, the liquid crystal layer 40 side, the center in the thickness direction of the glass substrate, etc. Note only that, in order to certainly block the light, the photonic crystal should be formed throughout the thickness direction.

Figure 8:
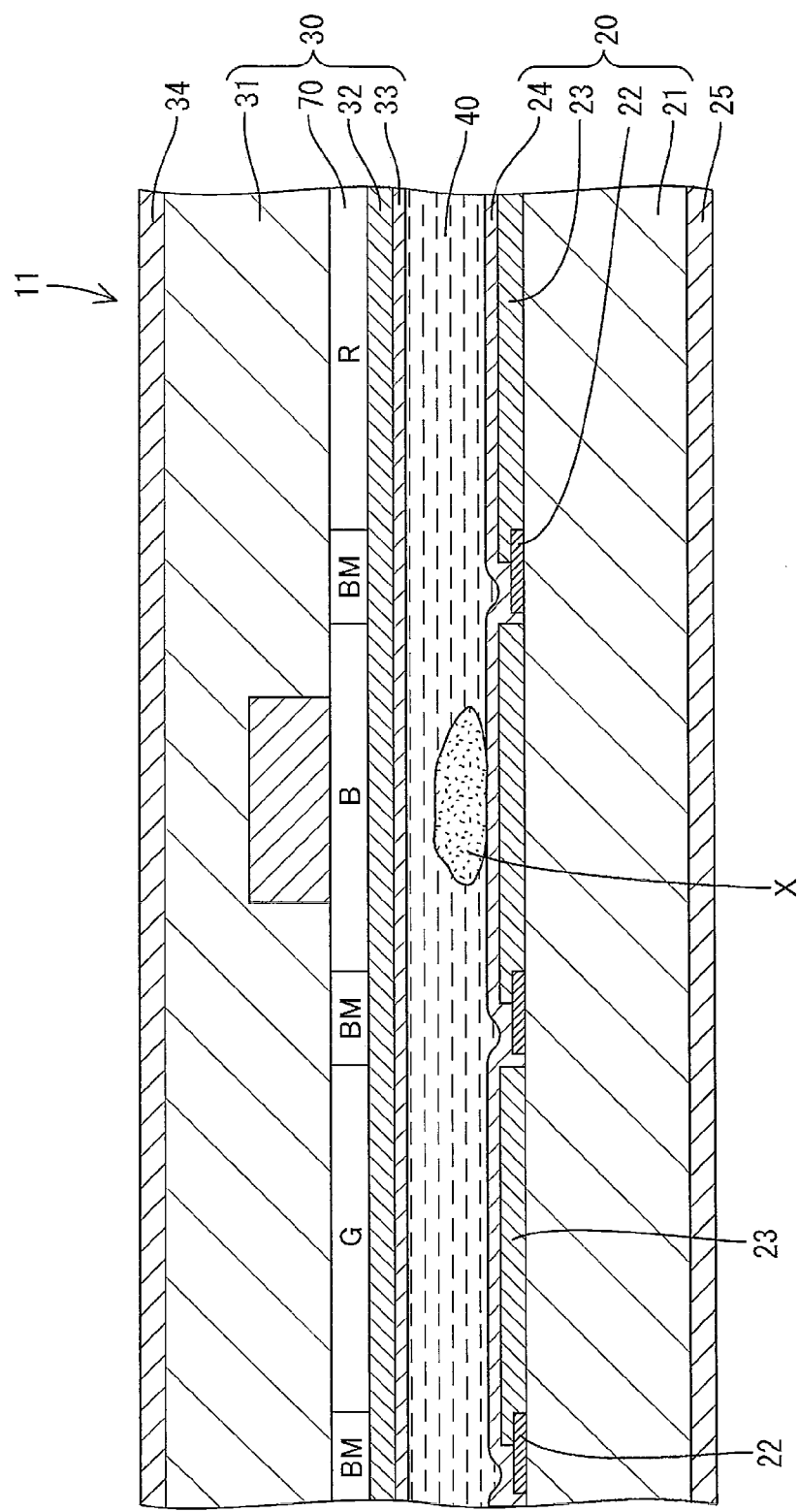
FIG. 8 is a sectional view illustrating a modification of the liquid crystal display device.
Figure 9:
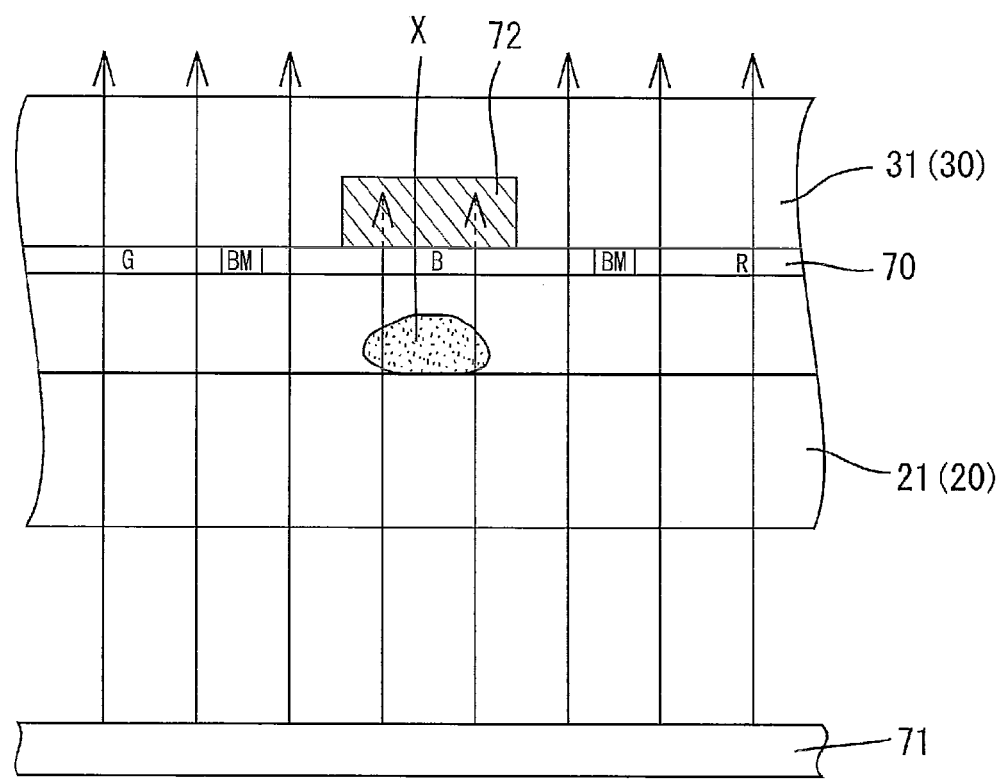
FIG. 9 is an explanatory view illustrating an operational effect of the liquid crystal display device of FIG. 8.

(3) The above-described embodiment is illustrated such that the light source is the LEDs 18, and the emission color of the LEDs 18 is the display color of the liquid crystal display device 10. As illustrated in FIGS. 8 and 9, the configuration may be such that the light source is a discharge tube (for example, a cold-cathode tube or a hot-cathode tube) 70 that emits white light, and a color filter 71 is provided so that the display color is determined by the color filter 71. In this case, a photonic crystal 72 is formed at least in the substrate 30 (the glass substrate 31) that is disposed on the side opposite from the backlight device 12. With this, the white light supplied from the backlight device 12 passes through the color filter 71 so that the color is specified, and the light having the specified color is absorbed by the photonic crystal 72. Thus, the luminance point defect can be invisible.

Note that the configuration may include both the LEDs 18 and the color filter 71. Also in this case, it is necessary for the photonic crystal to be formed in the substrate 30 (the glass substrate 31) disposed at least on the side opposite from the backlight device 12.

(4) In the above-described embodiment, the LEDs 18 that emit light having the respective single color of R, G, B are illustratively used as the light source having the wavelength selectivity. LEDs that include three tips of R, G, B and emit white light may be used. Furthermore, the display color is not limited to R, G, B; another color may be selected.

(5) In the above-described embodiment, the plurality of arrayed LEDs 18 are illustrated as the light source having the wavelength selectivity. Not limited to this, for example, a plurality of arrayed laser elements may be the light source. Furthermore, EL (electro luminescence) may be adopted.

(6) In the above-described embodiment, the photonic crystal 50 is formed by irradiation with the femtosecond laser having the pulse width on the order of 100 fs. From a standpoint of reducing damages to the portion surrounding the irradiation point, the pulse width should be smaller; laser having a pulse width still smaller but within the permissive range of the compensation performance may be used.

(7) In the above-described embodiment, the laser for irradiation to form the photonic crystal 50 has the wavelength of 780 nm. It is only necessary for the wavelength of the laser to be a wavelength wherewith the laser is less likely to be absorbed when passing through the glass substrates 21, 31; the wavelength from 750 nm to 850 nm is suitable. Furthermore, the other irradiation conditions may be modified according to the components of the irradiation-object glass substrate etc.

(8) In the above-described embodiment, the inspection step and the compensation step for the luminance point defect are performed on the identical device. These two steps may be performed on respective different devices. In this case, it is unnecessary for the backlight for inspection to be provided with the light source having the wavelength selectivity; it is only necessary to be capable of emitting white light. That is, after the luminance point defect occurrence portion is identified in the inspection step using the backlight for inspection, the color can be identified using a compensation device, and, according to the wavelength of the identified color, the photonic crystal can be formed.

(9) In the above-described embodiment, the luminance point defect compensation device 60 has the XYZ drive part 64, which includes the CCD camera 65 and the laser irradiation part 66, moves parallel to and perpendicularly to the stage 63. It may be configured such that the CCD camera and the laser irradiating part are fixed while the stage moves parallel to and perpendicular to the CCD camera and the laser irradiating part.

(10) In the above-described embodiment, the luminance point defect is due to the foreign substance X that has entered the liquid crystal layer 40. The TFTs 22 and the pixel electrodes 23 etc., which can cause malfunction due to a short circuit etc., can be the cause of the luminance point defect. The present invention is adoptable also to such a case.

(11) The present invention is adoptable also to the liquid crystal display device using a switch element other than the TFTs 22.

The invention claimed is:

1. A liquid crystal display device including:
   a liquid crystal panel having a liquid crystal layer provided between a pair of glass substrates; and
   a lighting device that supplies illumination light to the liquid crystal panel,
   wherein:
   at least one of the pair of glass substrates has a photonic crystal formed therein at a position that blocks light from reaching a luminance point defect occurrence portion that is a cause of a luminance point defect in the liquid crystal layer, the photonic crystal being configured to absorb light having a color displayable in the luminance point defect occurrence portion, and
   the photonic crystal is formed throughout a thickness direction of the glass substrate.

2. The liquid crystal display device according to claim 1, wherein:
   the lighting device is sufficiently provided with a light source having wavelength selectivity.

3. The liquid crystal display device according to claim 2, wherein:
   the light source having the wavelength selectivity has a plurality of arrayed LEDs.

4. The liquid crystal display device according to claim 2, wherein:
   the light source having the wavelength selectivity has a plurality of arrayed laser elements.

5. The liquid crystal display device according to claim 2, wherein:
   the photonic crystal is formed in one of the pair of glass substrates, the one of the pair of glass substrates being disposed at the lighting device side.

6. A method of manufacturing a liquid crystal display device including a liquid crystal panel having a liquid layer provided between a pair of glass substrates and a lighting device that supplies illumination light to the liquid crystal panel, the method comprising:

including a luminance point defect compensation step to compensate for a luminance point defect upon occurrence of the luminance point defect, the luminance point defect compensation step including the steps of:

identifying a color displayable in the luminance point defect occurrence portion that is a cause of the luminance point defect;

identifying a compensation position in at least one of the pair of glass substrates, the compensation position being capable of blocking light from reaching the luminance point defect occurrence portion; and forming a photonic crystal by irradiating the identified compensation position in the glass substrate with laser on the order of femtosecond or less, the photonic crystal absorbing light having the color displayable in the luminance point defect occurrence portion.

7. The method of manufacturing the liquid crystal display device according to claim 6 further comprising:

providing the lighting device with a light source having wavelength selectivity.

8. The method of manufacturing the liquid crystal display device according to claim 7 further comprising:

forming the light source having the wavelength selectivity by arraying a plurality of LEDs.

9. The method of manufacturing the liquid crystal display device according to claim 7 further comprising:

forming the light source having the wavelength selectivity by arraying a plurality of laser elements.

10. The liquid crystal display device according to claim 7 further comprising:

forming the photonic crystal in one of the pair of glass substrates, the one of the pair of glass substrates being disposed in the lighting device side.

11. The liquid crystal display device according to claim 6 further comprising:

forming the photonic crystal throughout a thickness direction of the glass substrate.

12. A liquid crystal display device including:

a liquid crystal panel having a liquid crystal layer provided between a pair of glass substrates; and a lighting device that supplies illumination light to the liquid crystal panel, wherein:

at least one of the pair of glass substrates has a photonic crystal formed therein at a position that blocks light from reaching a luminance point defect occurrence portion that is a cause of a luminance point defect in the liquid crystal layer, the photonic crystal being configured to absorb light having a color displayable in the luminance point defect occurrence portion, the lighting device is sufficiently provided with a light source having wavelength selectivity, and the photonic crystal is formed in one of the pair of glass substrates, the one of the pair of glass substrates being disposed at the lighting device side.

* * * * *